United States Patent
Grieshop

(10) Patent No.: US 11,032,963 B2
(45) Date of Patent: Jun. 15, 2021

(54) AGRICULTURAL APPARATUS AND METHOD

(71) Applicant: J. & M. Manufacturing Co., Inc., Fort Recovery, OH (US)

(72) Inventor: Dustan Grieshop, Fort Recovery, OH (US)

(73) Assignee: J. & M. Manufacturing Co., Inc., Fort Recovery, OH (US)

( * ) Notice: Subject to any disclaimer, the term of this patent is extended or adjusted under 35 U.S.C. 154(b) by 397 days.

(21) Appl. No.: 16/229,993

(22) Filed: Dec. 21, 2018

(65) Prior Publication Data

US 2020/0196514 A1 Jun. 25, 2020

(51) Int. Cl.
| | |
|---|---|
| *A01B 73/06* | (2006.01) |
| *A01B 63/32* | (2006.01) |
| *A01B 21/08* | (2006.01) |
| *A01B 63/00* | (2006.01) |
| *A01B 73/04* | (2006.01) |

(52) U.S. Cl.
CPC ............ *A01B 73/067* (2013.01); *A01B 21/08* (2013.01); *A01B 63/008* (2013.01); *A01B 63/32* (2013.01); *A01B 73/044* (2013.01)

(58) Field of Classification Search
CPC ....... A01B 21/08; A01B 63/008; A01B 63/32; A01B 73/044; A01B 73/067
See application file for complete search history.

(56) References Cited

U.S. PATENT DOCUMENTS

| | | | | |
|---|---|---|---|---|
| 2,765,610 | A * | 10/1956 | Oehler | A01B 21/083 172/442 |
| 3,090,448 | A * | 5/1963 | Hotchkiss, Jr. | A01B 49/02 172/178 |
| 3,469,636 | A * | 9/1969 | Kurz Royr | A01B 21/08 172/314 |
| 3,487,883 | A * | 1/1970 | Newhouse | A01B 21/08 172/314 |
| 3,654,999 | A * | 4/1972 | Fischer | A01B 73/067 172/311 |
| 4,344,572 | A | 8/1982 | Tyler | |

(Continued)

OTHER PUBLICATIONS

Thurston Manufacturing Company, Press Release "BLU-JET Introduces 90' Liquid Applicator", Sep. 2, 2008, 2 pages.

*Primary Examiner* — Jessica H Lutz
(74) *Attorney, Agent, or Firm* — Rooney IP, LLC

(57) ABSTRACT

An agricultural apparatus includes a first main wing and at least one wheel on one side and a second main wing and at least one wheel on an opposite side. The first and second main wings are pivotable about respective axes of rotation between extended positions in which the first and second main wings extend laterally outward from respective opposite sides of the frame structure, and retracted, storage positions in which the first and second main wings extend generally along a length of the frame structure for shipping or transport. The first and second main wings include respective raised sections each configured to extend over a respective wheel on a corresponding side of the frame structure in the storage position. The raised sections each include a frame having a generally concave shape receiving a portion of one of the first and second wheels in the storage position.

20 Claims, 10 Drawing Sheets

(56) References Cited

U.S. PATENT DOCUMENTS

| | | | |
|---|---|---|---|
| 5,154,240 A * | 10/1992 | Carrick | A01B 73/067 172/311 |
| 5,346,019 A | 9/1994 | Kinzenbaw et al. | |
| 5,887,390 A | 3/1999 | Schulz | |
| 6,675,907 B2 | 1/2004 | Moser et al. | |
| 7,429,003 B2 | 9/2008 | Thompson et al. | |
| 7,585,000 B1 | 9/2009 | Hoek | |
| 7,740,084 B2 | 6/2010 | Rosenboom | |
| 8,342,257 B2 | 1/2013 | Rosenboom | |
| 8,464,967 B2 | 6/2013 | Kuphal et al. | |
| 8,528,657 B1 | 9/2013 | Rosenboom | |
| 8,763,716 B2 | 7/2014 | Rosenboom | |
| 9,440,691 B2 | 9/2016 | Rosenboom | |
| D782,545 S | 3/2017 | Forth | |
| 9,839,175 B2 | 12/2017 | Van Mill et al. | |
| 9,844,173 B2 | 12/2017 | Fast et al. | |
| 2014/0034341 A1 * | 2/2014 | Fast | A01B 73/067 172/311 |
| 2016/0050838 A1 * | 2/2016 | Van Mill | A01B 73/067 172/1 |
| 2018/0118285 A1 | 5/2018 | Kahlig | |

* cited by examiner

AGRICULTURAL APPARATUS AND METHOD

TECHNICAL FIELD

The present invention generally relates to agricultural apparatus for conditioning or modifying soil and/or plantings and, more particularly, to apparatus configured to apply fertilizers, pesticides, herbicides or the like to the soil and/or plantings.

BACKGROUND

Agricultural apparatus are used to condition or modify soil and/or plantings, such as tilling and/or applying liquid materials or granulated solid materials to the soil and/or to plantings. The liquid or granulated solid materials may be fertilizers, pesticides, herbicides or the like. The apparatus often make use of foldable tool bars actuated between expanded and retracted positions. The expanded position allows the tool bars to increase the effective reach or coverage of the apparatus while operating over the ground, and the retracted position makes the apparatus more compact for storage and transport. In the expanded position, the tool bars are oriented generally horizontal and perpendicular to the direction of travel or lengthwise extent of the apparatus. In the retracted storage and transport position, the tool bars of various apparatus will extend generally parallel to or along the lengthwise extent of the apparatus.

Even with certain improvements in this area, the folded or retracted position of the tool bars can result in the apparatus having an undesirably large footprint. Therefore, it would be desirable to provide such apparatus with one or more features allowing reduced width of the apparatus when in the storage and transport position.

SUMMARY

An illustrative embodiment the invention provides an agricultural apparatus, comprising a frame structure having a longitudinal axis and laterally opposed sides, a first wheel on one side of the frame structure, and a second wheel on an opposite side of the frame structure for allowing movement of the apparatus during transport and operation. A center tool bar is coupled to the frame structure. First and second main wings are respectively coupled for pivoting movement relative to opposite end portions of the center tool bar. The first and second main wings each include inner and outer wing sections. The first main wing is on one side of the frame structure and the second main wing is on an opposite side of the frame structure. The first and second main wings are pivotable about respective axes of rotation between extended positions in which the first and second main wings extend laterally outward from respective opposite sides of the frame structure, and retracted, storage positions in which the first and second main wings extend generally along a length of the frame structure for shipping or transport. First and second sets of tools are respectively coupled to the first and second main wings. The first and second main wings include respective raised sections each configured to extend over a respective wheel on a corresponding side of the frame structure in the storage position, and the raised sections are each comprised of a frame having a generally concave shape receiving a portion of one of the first and second wheels in the storage position.

The apparatus may have one or more additional or optional features as further described herein. For example, the apparatus may further include first and second auxiliary wings having additional tools coupled thereto. The additional tools of the auxiliary wings are collectively positioned between the respective sets of tools coupled to the first and second main wings. The first and second auxiliary wings may be pivotable to allow each of the first and second auxiliary wings to be rotated between respective storage positions and extended positions. The storage positions of the first and second auxiliary wings may be substantially within a widthwise dimension of the apparatus defined by the first and second wheels. The outer wing sections may be respectively rotatable into positions above the inner wing sections in the storage positions.

The apparatus may further include first and second actuators coupled respectively to the inner wing sections of the first and second main wings for rotating the first and second main wings relative to the center tool bar. First and second latch mechanisms may be located at the respective ends of the center tool bar. The first and second latch mechanisms lock and unlock the first and second main wings through the use of the respective first and second actuators as the first and second main wings are rotated relative to the center tool bar.

Each of the inner wing sections may further comprise an inner wing member pivotally coupled to a mid wing member, and each of the outer wing sections may comprise an outer wing member, with the outer wing members being pivotally coupled, respectively, to the mid wing members. The one or more of the tools may comprise at least one of a coulter, a knife, a spike, a tine, and a ripper point. One or more of the tools may be configured to be oriented vertically upward when in the storage position. One or more of the tools may be configured to fit substantially between the first and second wheels when in the storage position. As a further option, all of the tools may be configured to fit substantially between the first and second wheels when in the storage position. When the tools comprise coulters, the coulters are coupled for rotation relative to the first and second main wings. The apparatus may further include an actuator coupled with the center tool bar for vertically raising and lowering the center tool bar, the first main wing and the second main wing simultaneously between a raised position and a lower, operational position configured to engage the tools with the ground. A container may be included for holding either a liquid or a granulated solid material, which is then dispensed from suitable dispensing mechanisms carried by the first and second main wings, auxiliary wings and/or center tool bar.

In another general aspect or embodiment of the invention, an agricultural apparatus is provided with a frame structure having a longitudinal axis and laterally opposed sides, a first wheel on one side of the frame structure, and a second wheel on an opposite side of the frame structure for allowing movement of the apparatus during transport and operation. A center tool bar is coupled to the frame structure. First and second main wings are respectively coupled for pivoting movement relative to opposite end portions of the center tool bar. The first and second main wings each include inner and outer wing sections. The first main wing is on one side of the frame structure and the second main wing is on an opposite side of the frame structure. First and second auxiliary wings are pivotable between extended positions and retracted, storage positions for shipping or transport. Respective sets of tools are coupled to each of the first and second main wings and to the first and second auxiliary wings. The sets of tools coupled to the first and second auxiliary wings are positioned between the sets of tools coupled to the first and second main wings. An actuator is coupled to the center tool bar for vertically raising and lowering the center tool bar, the first main wing and the second main wing simultaneously between a raised position and a lower, operational position configured to engage the tools with the ground. The first and second main wings include respective raised sections each configured to extend over a respective wheel on a corresponding side of the frame structure in the storage position, and the raised sections are each comprised of a frame having a generally concave shape receiving a portion of one of the first and second wheels in the storage position. One or more of the additional or optional features described above or otherwise described herein may be incorporated into this embodiment of the invention.

In another general aspect or embodiment of the invention, an agricultural apparatus is provided with a frame structure having a longitudinal axis and laterally opposed sides, a first wheel on one side of the frame structure, and a second wheel on an opposite side of the frame structure for allowing movement of the apparatus during transport and operation. A container is coupled to the frame structure and holds a liquid or a granulated solid material to be applied. First and second main wings are respectively coupled for pivoting movement relative to opposite end portions of the center tool bar. The first and second main wings each include inner and outer wing sections. The first main wing is on one side of the frame structure and the second main wing is on an opposite side of the frame structure. The first and second main wings are pivotable about respective axes of rotation between extended positions in which the first and second main wings extend laterally outward from respective opposite sides of the frame structure, and retracted, storage positions in which the first and second main wings extend generally along a length of the frame structure for shipping or transport. Dispensers are respectively coupled to the first and second main wings, and dispense either liquid material or granulated solid material held in the container. The first and second main wings include respective raised sections each configured to extend over a respective wheel on a corresponding side of the frame structure in the storage position, and the raised sections are each comprised of a frame having a generally concave shape receiving a portion of the first and second wheels in the storage position. One or more of the additional or optional features described above or otherwise described herein may be incorporated into this embodiment of the invention.

In another general aspect or embodiment of the invention, an agricultural apparatus is provided with a frame structure having a longitudinal axis and laterally opposed sides, a first wheel on one side of the frame structure, and a second wheel on an opposite side of the frame structure for allowing movement of the apparatus during transport and operation. A container is coupled to the frame structure and holds a liquid or a granulated sold material to be applied. First and second main wings are respectively coupled for pivoting movement relative to opposite end portions of the center tool bar. The first and second main wings each include inner and outer wing sections. The first main wing is on one side of the frame structure and the second main wing is on an opposite side of the frame structure. First and second auxiliary wings are pivotable between extended positions and retracted, storage positions for shipping or transport. Respective dispensers are coupled to each of the first and second main wings and to the first and second auxiliary wings. The dispensers coupled to the first and second auxiliary wings are positioned between the dispensers coupled to the first and second main wings. An actuator is coupled to the center tool bar for vertically raising and lowering the center tool bar, the first main wing and the second main wing simultaneously between a raised position and a lower, operational position configured to dispense material from the container and the dispensers. The first and second main wings include respective raised sections each configured to extend over a respective wheel on a corresponding side of the frame structure in the storage position, and the raised sections are each comprised of a frame having a generally concave shape receiving a portion of one of the first and second wheels in the storage position. One or more of the additional or optional features described above or otherwise described herein may be incorporated into this embodiment of the invention.

Methods for operating an agricultural apparatus are also provided by the invention. In one general method, an agricultural apparatus is used and may comprise elements and features generally as described herein in any desired combination. The method generally comprises rotating the first and second main wings about respective axes of rotation to extended positions in which the first and second main wings extend laterally outward from the frame structure for an agricultural operation. The first and second main wings are then rotated from the extended positions to respective retracted, storage positions generally along a length of the frame structure for shipping or transport, wherein respective raised, concave sections of the first and second main wings extend over a respective one of the first or second wheels on a corresponding side of the frame structure in the storage position.

The method may comprise other additional or optional steps or features. For example, the apparatus may further comprise first and second auxiliary wings, and additional sets of tools respectively coupled to the first and second auxiliary wings, and the method may further include: rotating the first and second auxiliary wings between respective storage positions located in front of the container, and first and second laterally extended positions, and engaging tools with the ground when the first and second main wings and the first and second auxiliary wings are in their extended positions. The first and second auxiliary wings may be pivotable about respective horizontal axes of rotation, and the method may further comprise: rotating each of the first and second auxiliary wings between respective storage positions and extended positions about the respective horizontal axes. The first and second auxiliary wings may be placed in storage positions substantially between the first and second wheels. The apparatus may further comprise a center tool bar pivotally coupled to the first main wing on one end portion thereof and pivotally coupled to the second main wing on the opposite end portion thereof. First and second actuators may be coupled respectively to the first and second main wings, and first and second latch mechanisms may be located at the respective end portions of the center tool bar. The method then further comprises rotating the first and second main wings relative to the center tool bar with the respective first and second actuators; and locking the first and second main wings in the extended positions with the first and second latch mechanisms by using the respective first and second actuators as the first and second main wings are rotated relative to the center tool bar.

Each of the inner wing sections may further comprise an inner wing member pivotally coupled to a mid wing member, and each of the outer wing sections may comprise an outer wing member. The outer wing members are pivotally coupled, respectively, to the mid wing members, and the method may further comprise: establishing a folded condition of the apparatus by: a) folding the respective outer wing members into positions above the mid wing members; and b) rotating the inner wing members rearwardly to place the raised, concave sections over the first and second wheels.

The method may further comprise vertically raising and lowering the first and second main wings simultaneously between a raised position and a lower, operational position configured to engage the tools with the ground and/or apply liquid or solid granulated material from the container.

The methods may have additional and/or optional features and/or method steps as will be appreciated from a review of this disclosure.

Additional aspects and advantages of the invention will become more apparent upon further review of the detailed description of the illustrative embodiments taken in conjunction with the accompanying drawings.

DETAILED DESCRIPTION OF THE ILLUSTRATIVE EMBODIMENTS

Figure 1:
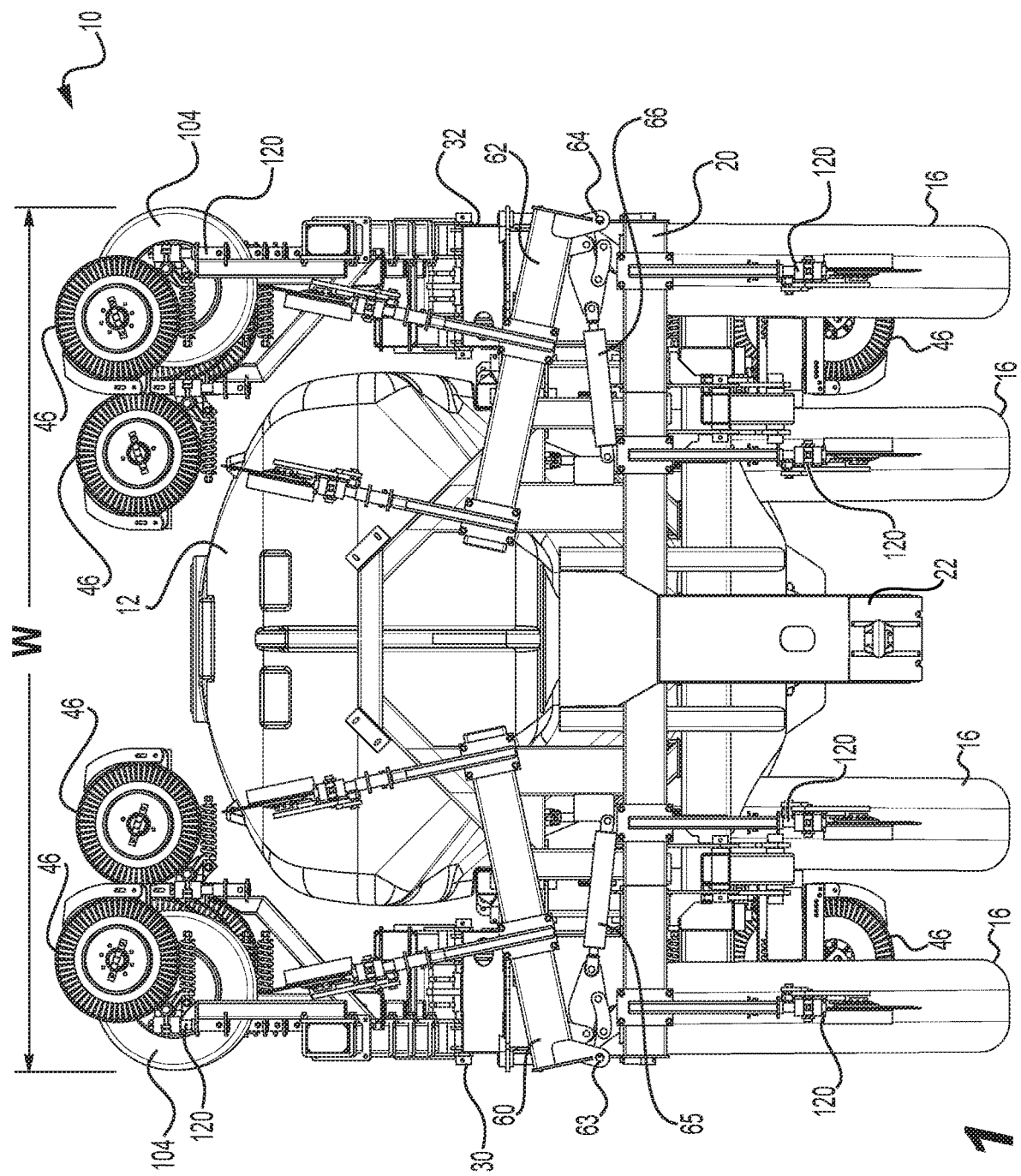
FIG. 1 is a front elevational view of an apparatus configured in accordance with an illustrative embodiment of the invention, and illustrating the apparatus in a storage and transport condition.
Figure 2:
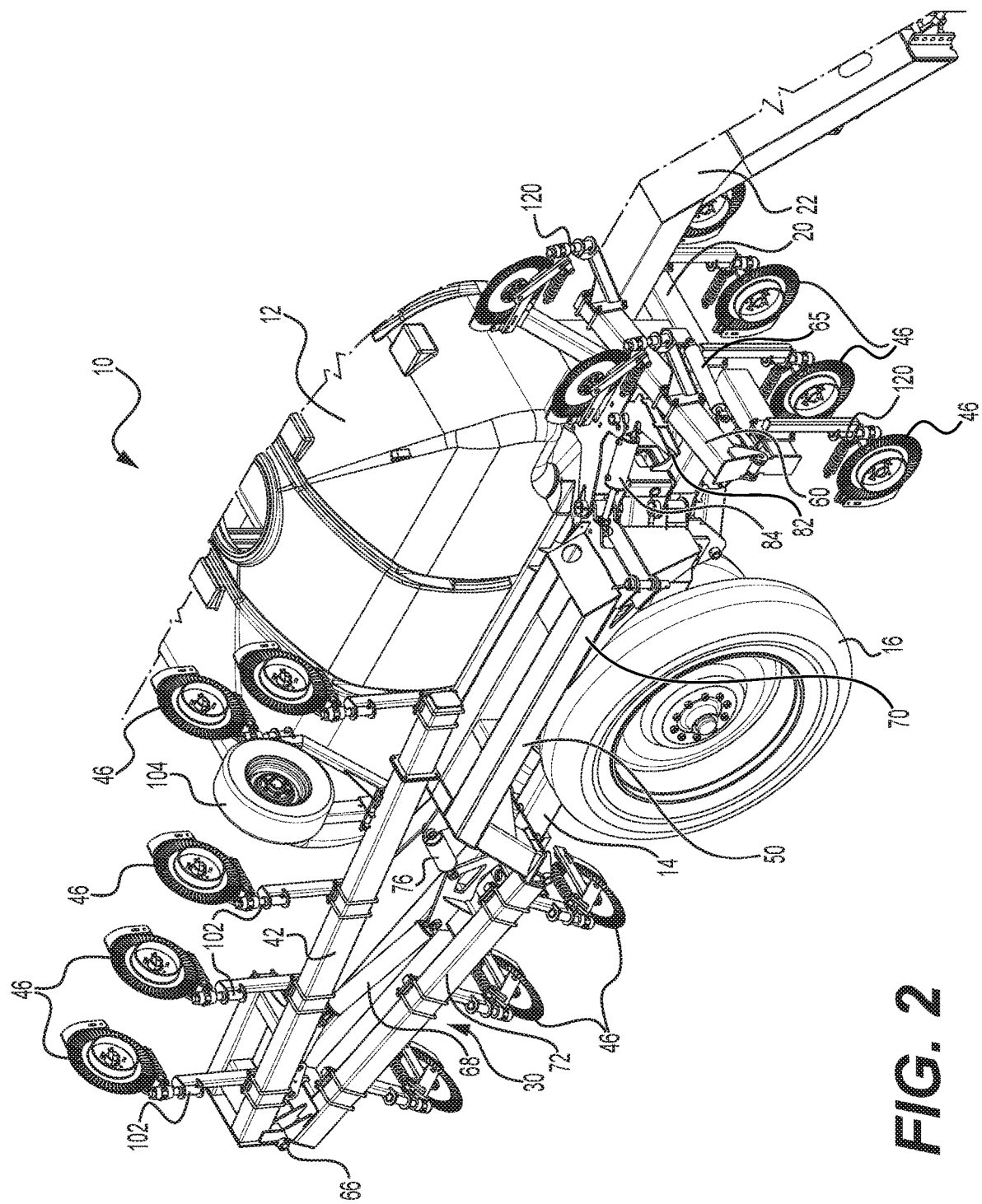
FIG. 2 is a front perspective view of the apparatus shown in FIG. 1, fragmented to show approximately one half of the apparatus.
Figure 3:
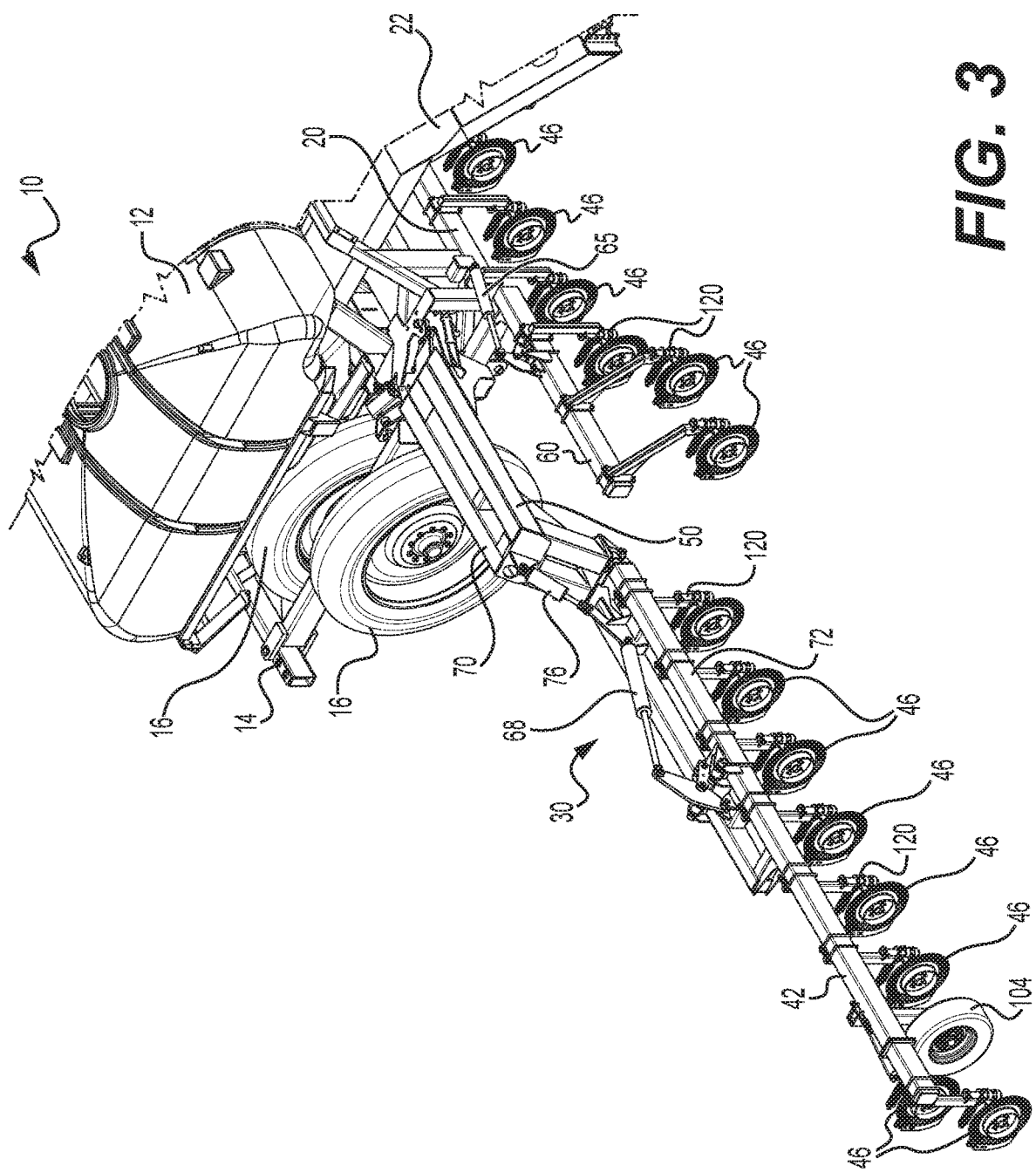
FIG. 3 is a front perspective view similar to FIG. 2, but illustrating the apparatus in an expanded, operating condition.
Figure 4:
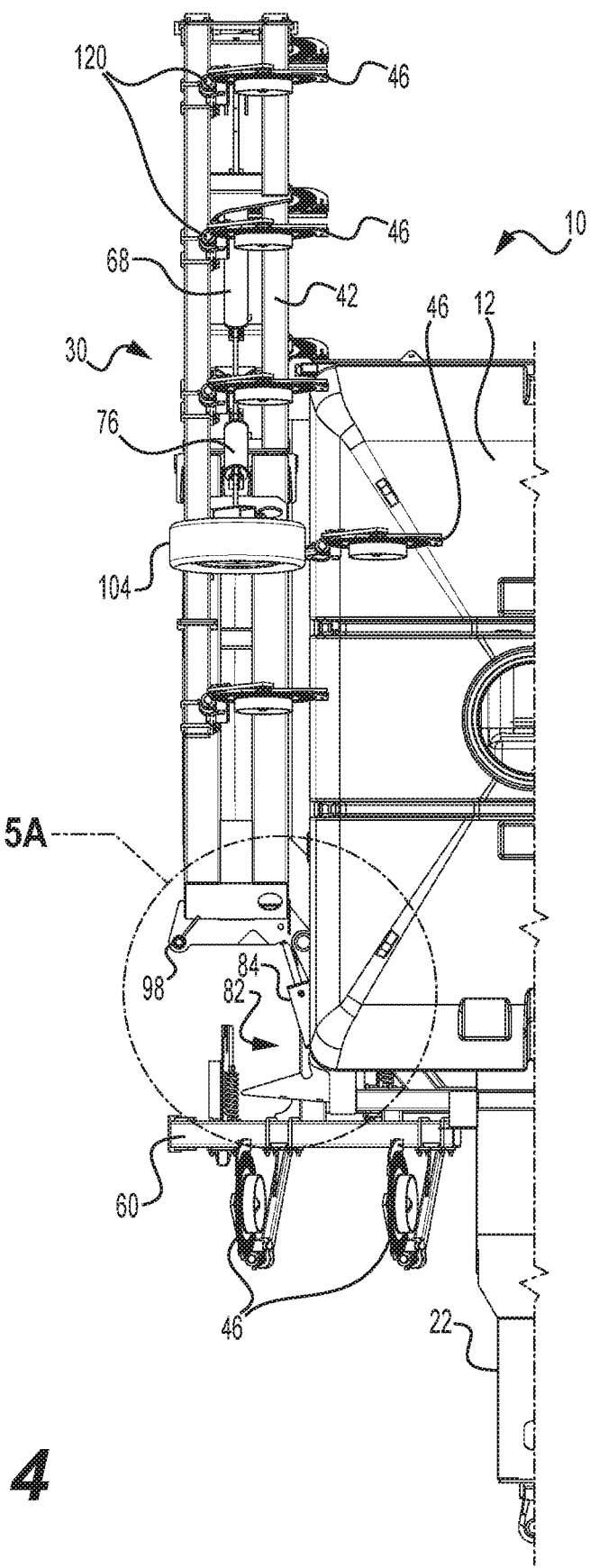
FIG. 4 is a top view of the apparatus, fragmented to illustrate one side with the main wing of the tool bar assembly folded to extend generally along a lengthwise extent of the container.

Referring first to FIGS. 1 through 3, an illustrative example of the invention is shown as an agricultural apparatus 10. In this example, apparatus 10 is an applicator configured to apply or dispense liquid held in a container and, specifically, a liquid holding tank 12. The liquid may be of any desired type but examples include fertilizers, pesticides and herbicides. In other embodiments the tank 12 may be a container that is not designed to hold a liquid but instead may be a container for holding a granulated solid material. In either case, the liquid material or solid granulated material is suitably directed onto the soil and/or plantings. More specifically, the applicator 10 includes a frame structure 14 having a longitudinal axis or extend parallel to the direction of travel and laterally opposed sides. The frame structure 14 may be of any desired design or configuration suitable for the particular needs of an application as generally described herein. In this illustrative embodiment the applicator 10 has two wheels 16 mounted for rotation on each lateral side of the frame structure 14, although it will be understood that there may only be one wheel 16 on each side of the frame structure 14, or there may be more than two wheels 16 on each side of the frame structure 14. The tank 12 is rigidly mounted or coupled to the frame structure 14. A center tool bar 20 is also coupled to the frame structure 14 in a manner, further described below, allowing the center tool bar 20 to be raised and lowered. It will be appreciated that the center tool bar 20 is actually comprised of multiple pieces rigidly secured together, such as by welding. A hitch 22 is provided at the front end of the applicator 10, and is formed as a unit with the frame structure 14, such as by welding. The hitch 22 allows the applicator 10 to be coupled to a tow vehicle, such as a tractor (not shown). In other embodiments or uses, the applicator 10 could be pushed, self-propelled, or made as part of another agricultural implement, such as a tractor. FIG. 1 illustrates the entire applicator 10 in a front view. FIGS. 2 and 3 illustrate only approximately half of the applicator 10, with the understanding that the component parts and operation of the other half are identical and a mirror image of the illustrated half. Therefore, the description to follow generally relates to the illustrated half of apparatus 10 with the understanding that the description applies equally to the non-illustrated half.

Figure 6A:
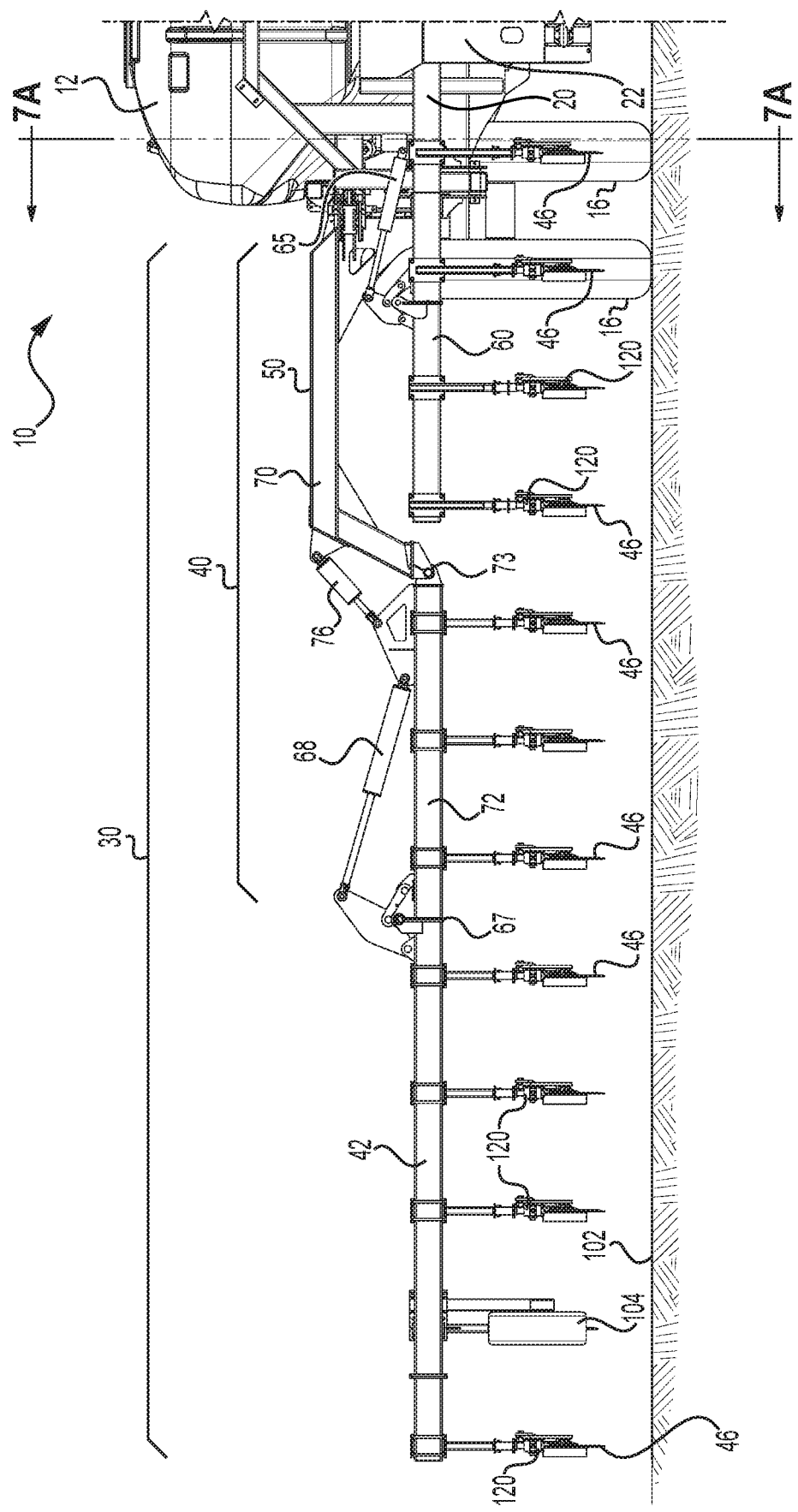
FIG. 6A is a front elevational view illustrating one side of the apparatus with one of the main wings and auxiliary wings in a raised position off the ground.
Figure 6B:
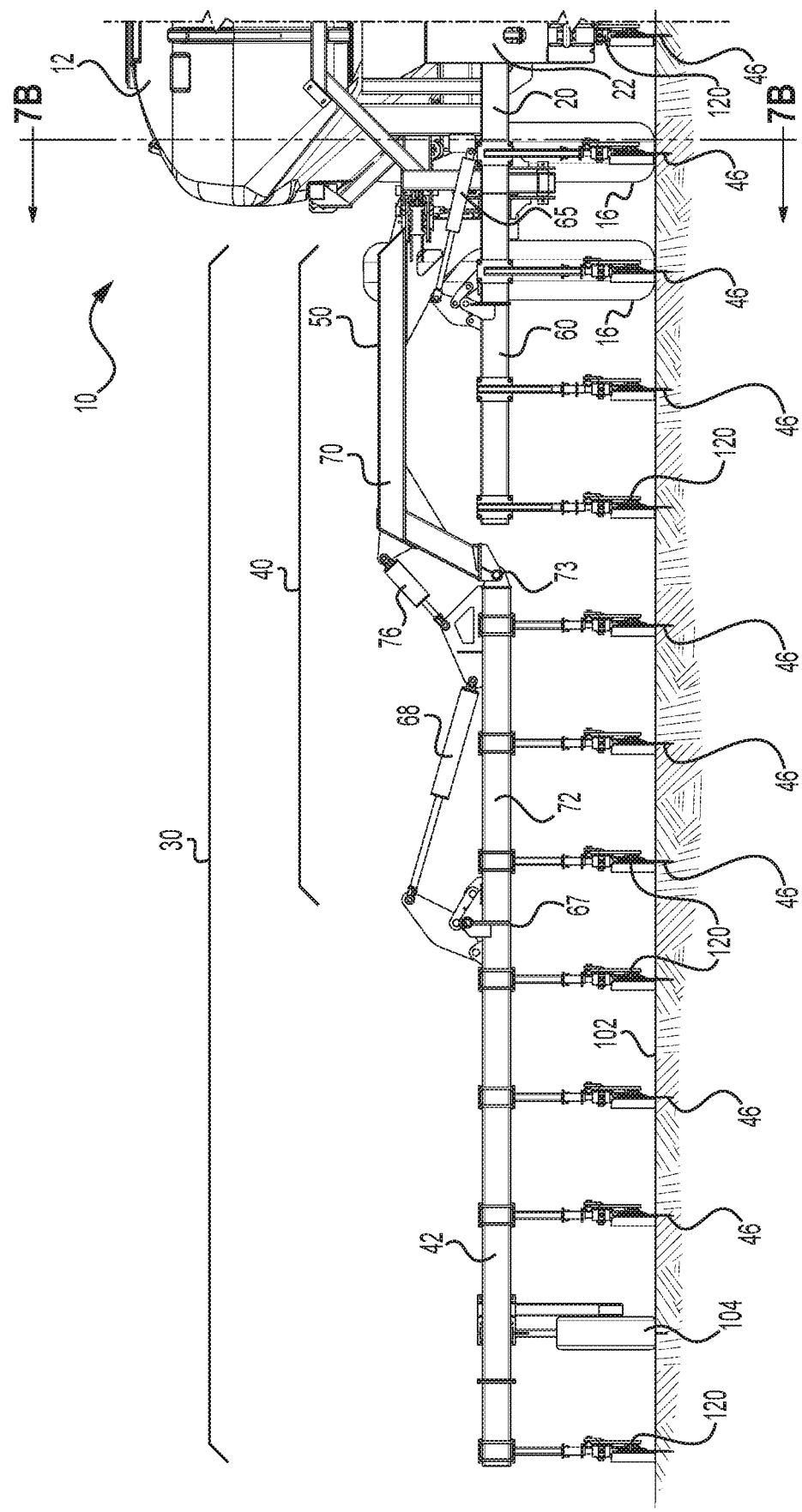
FIG. 6B is a front elevational view similar to FIG. 6A, but illustrating the main wing and auxiliary wing in a lowered position with tools engaging the ground.
Figure 7A:
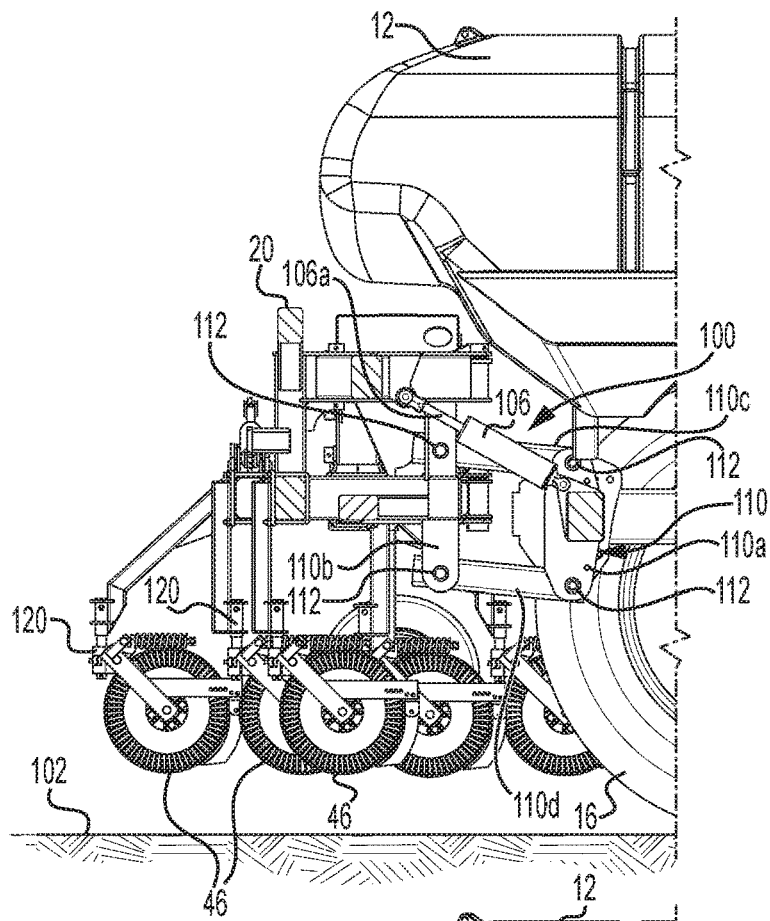
FIG. 7A is a cross section taken along line 7A-7A of FIG. 6A, showing the four bar linkage and actuator as used to raise the main wings and auxiliary wings.
Figure 7B:
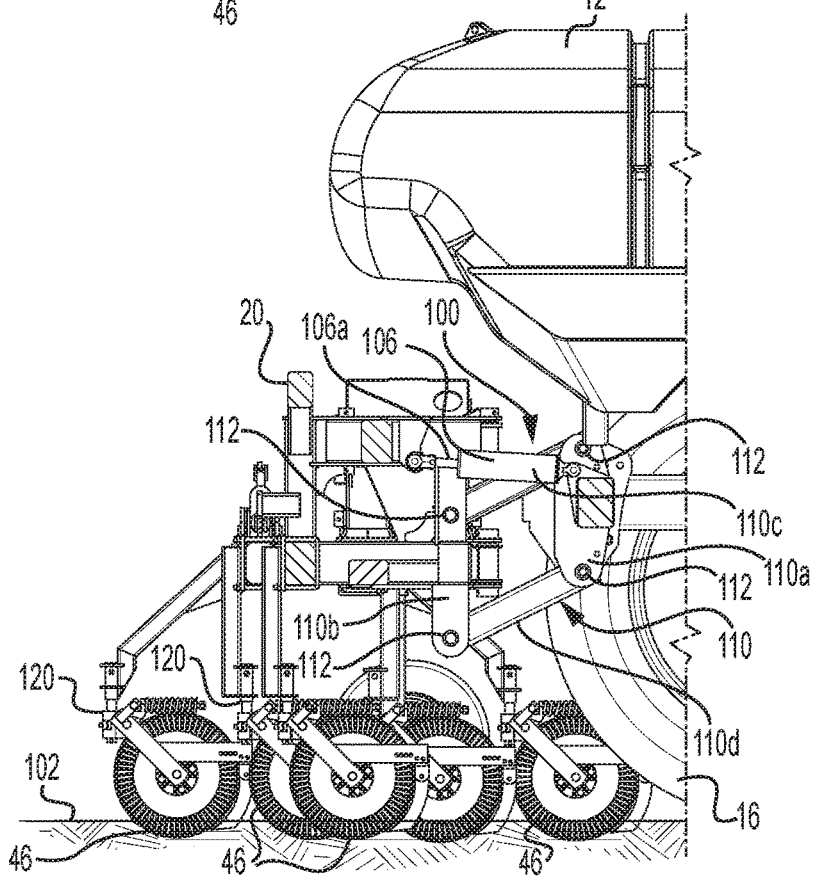
FIG. 7B is a cross section taken along line 7B-7B of FIG. 6B, showing the four bar linkage and actuator as used to lower the main wings and auxiliary wings.

Still referring to FIGS. 1-3, together with FIGS. 6A and 6B, a main wing 30 is coupled for pivoting movement relative to opposite end portions of the center tool bar 20. As mentioned above, FIGS. 2 and 3 only show one half of the applicator 10, and FIGS. 6A and 6B only show one half of the applicator 10 as well, so that the figures are larger for clarity. This description of the illustrated main wing 30 and other structure shown in these figures applies equally to the other main wing 32 (FIG. 1, shown in the retracted position), as well as other identical structure on the other side of the applicator 10. The main wing 30 includes an inner wing section 40 and an outer wing section 42. The main wing 30 is pivotable about an axis of rotation between an extended or expanded position (FIGS. 3, 6A and 6B) in which the main wing 30 extends laterally outward from the frame structure 14, and a retracted, storage position (FIGS. 1 and 2) in which the main wing 30 extends generally along a length of the frame structure 14 (i.e. in the direction of travel for the applicator 10) for shipping or transport purposes. Sets of tools 46 are respectively coupled to the first and second main wings 30, 32. The tools 46 may comprise at least one of a coulter, a knife, a spike, a tine, and a ripper point. In this embodiment, the tools 46 are coulters coupled for rotation relative to the structure to which they are mounted, e.g., the main wings 30, 32.

The main wings 30, 32 include respective raised sections 50 each configured to extend over a respective wheel 16 on a corresponding side of the frame structure 14 in the storage position (FIGS. 1 and 2). As best shown in FIG. 2, the raised sections 50 are each comprised of a wing frame or portion having a generally concave shape which receives a portion of one of the first and second wheels 16 in the retracted, storage position, directly underneath the raised section 50, as shown. In this retracted position, the overall applicator width "W" (FIG. 1) is reduced to an extent that makes the applicator 10 more compact during storage and transport along roads, for example. Moreover, as will be even more clear from the description to follow, the pivoting or rotational movement of the wings 30, 32 in the forward and rearward directions about a pivot connection between the main wings 30, 32 and the opposite end portions of the center tool bar 20 does not need any vertical component of travel to clear the wheel(s) 16. Instead, the concave configuration of the wing portion 50 provides clearance between the respective main wings 30, 32 and the wheels 16 on each side of the applicator 10 as the main wings 30, 32 rotate generally in a horizontal plane to the retracted storage/transport position.

The applicator 10 further includes first and second auxiliary wings 60, 62 having additional tools 46 coupled thereto. The additional tools 46 of the auxiliary wings 60, 62 are collectively positioned between the respective sets of tools 46 coupled to the first and second main wings 30, 32. More specifically, the additional sets of auxiliary tools 46 are positioned between the tools 46 of the main wings 30, 32 and further tools 46 coupled to the center tool bar 20. The first and second auxiliary wings 60, 62 are pivotable about respective pivot joints 63, 64 (FIG. 1) to allow each of the first and second auxiliary wings 60, 62 to be rotated between respective storage positions (FIGS. 1 and 2) and extended positions (FIGS. 3, 6A and 6B). This rotation may occur about a horizontal pivot axis, as shown, or about another desired axis (not shown). Respective actuators, such as hydraulic cylinders 65, 66 are pivotally coupled between the auxiliary wings 60, 62 and the central tool bar 20 to actuate the auxiliary wings 60, 62 between the extended and storage positions. The storage positions of the first and second auxiliary wings 60, 62 are substantially within a widthwise dimension "W" of the apparatus 10 defined by the outermost wheels 16. It will be appreciated that "substantially within" encompasses configurations in which a small amount of structure associated with the apparatus 10 may lie outside the width "W" defined by the outermost wheels 16. The embodiment shown has a width "W" of about 11½ feet, and a total width (including all structural elements of apparatus 10) approaching 12 feet. This is the typical total width limit that would not require the apparatus 10 to be designated as an "oversized load" on a roadway.

The outer wing sections 42 (only one shown in FIGS. 2 and 3) are respectively rotatable into positions above the inner wing sections 40 in the storage positions (FIG. 2). This rotation is facilitated by a pivot connection 67 between the two wing sections 40, 42 and a hydraulic cylinder or actuator 68 pivotally coupled between the two wing sections 40, 42. Each of the inner wing sections 40 further comprises an inner wing member 70 pivotally coupled to a mid wing member 72 at a pivot joint 73, and each of the outer wing sections 42 comprise an outer wing member. The outer wing member or section 42 is coupled to the mid wing member 72 at pivot connection 67. A hydraulic cylinder 76 is pivotally coupled between the inner wing member 70 and the mid wing member 72 for pivoting the mid wing member 72 and attached outer wing member 42 into an upwardly angled storage/transport orientation as shown in FIG. 2.

Figure 5A:
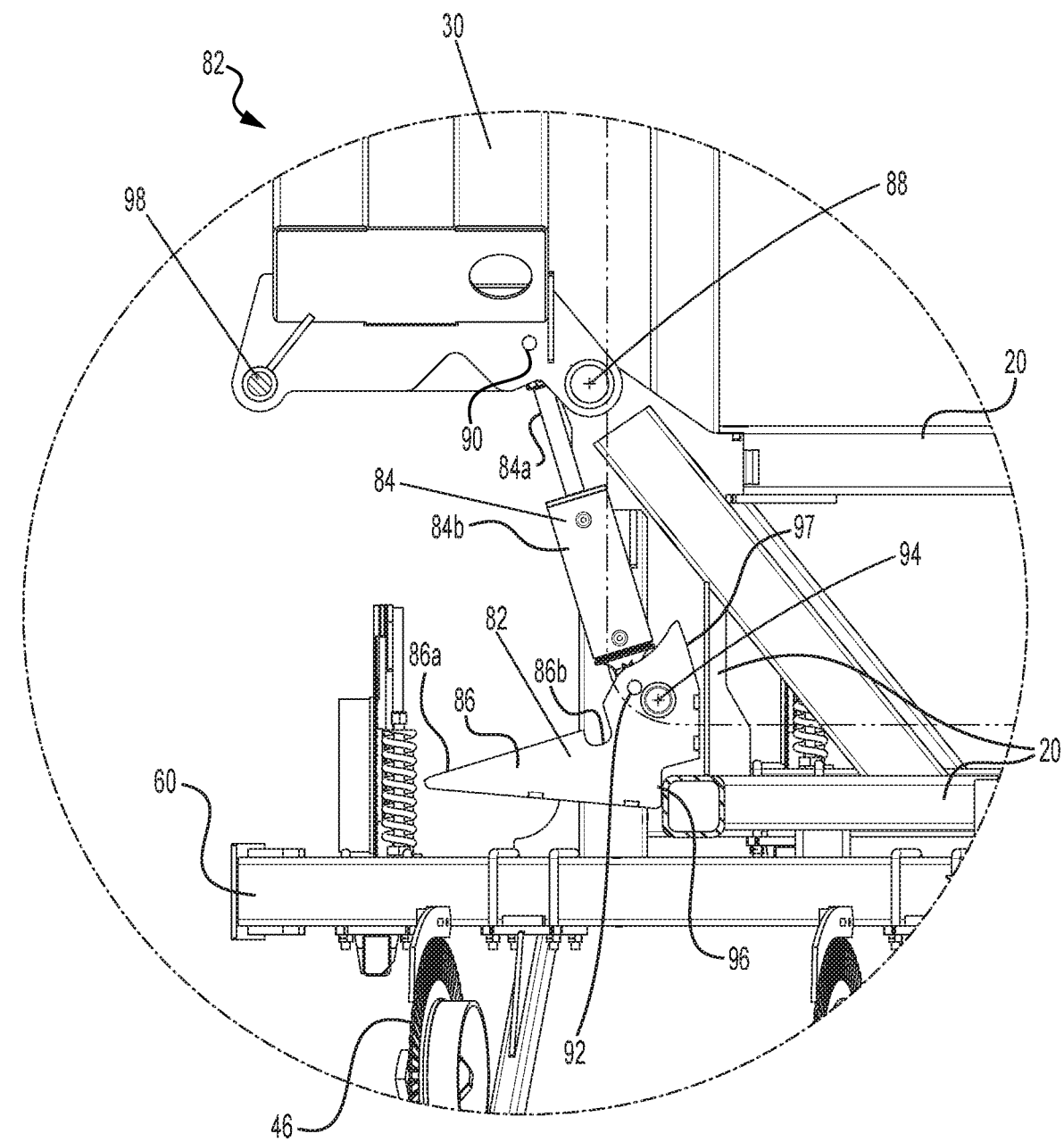
FIG. 5A is an enlarged view of encircled area "5A" shown in FIG. 4, and illustrating a latch mechanism for latching or locking the main wing, with the latch mechanism in an unlatched state, and with the auxiliary wing removed for clarity.
Figure 5B:
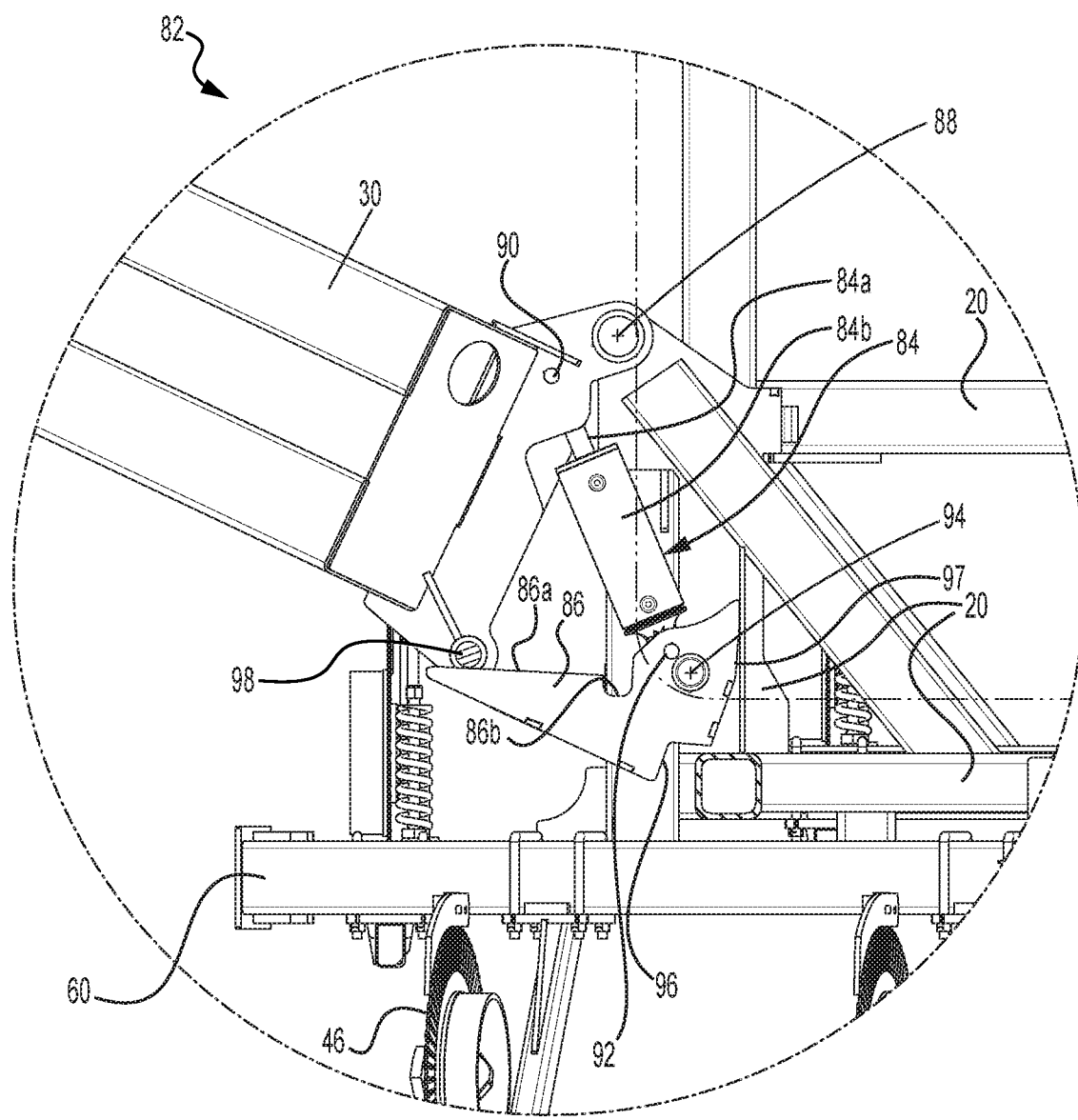
FIG. 5B is an enlarged view similar to FIG. 5A, but illustrating operation of the latch mechanism as the main wing is being unfolded.
Figure 5C:
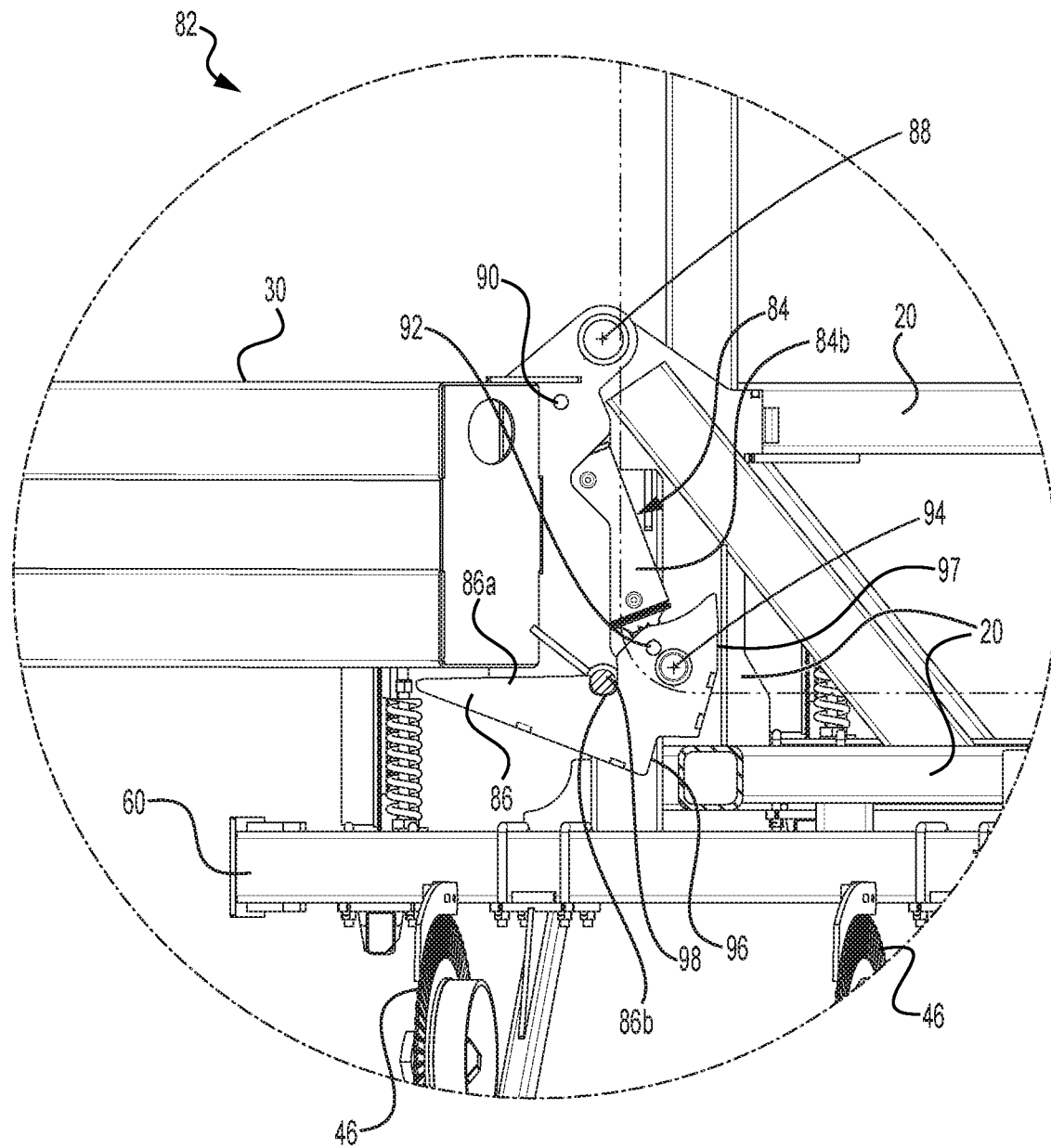
FIG. 5C is an enlarged view similar to FIG. 5B, but illustrating full extension or unfolding of the main wing with the latch mechanism in a locked state.

Referring to the above-mentioned figures in addition to FIGS. 5A-5C, the apparatus 10 further includes actuators, such as a hydraulic cylinder 84 (only one of two shown) respectively coupled to the inner wing sections 40 of the first and second main wings 30, 32 for rotating the first and second main wings 30, 32 relative to the center tool bar 20. First and second latch mechanisms 82 (only one shown) are located at the respective opposite ends of the center tool bar 20 for rotating and locking the main wings 30, 32. As previously mentioned, these components are identical on each of the left and right sides of the apparatus 10 and, therefore, only one of the latch mechanisms 82 is described below in connection with FIGS. 5A-5C. The latch mechanism 82 locks and unlocks the main wing 30 through the use of an actuator, such as a hydraulic cylinder 84, and a latch element or plate 86 having an inclined edge portion 86a and a notch 86b at the top of the inclined edge portion 86a. The main wing 30 is coupled to the center tool bar 20 by a pivot 88 allowing the main wing 30 to rotate about a vertical axis between the storage and transport position shown in FIG. 5A and the extended position shown in FIG. 5C. The hydraulic cylinder 84 has a piston 84a coupled to the main wing 30 by a pivot 90 and a cylinder portion 84b coupled by a pivot 92 to the latch plate 86. The latch plate 86 is pivotally connected to the center tool bar 20 at a pivot joint 94. The latch plate 86 further includes a notch 96 that acts as a stop against a portion of the center tool bar 20 in order to stop the main wing 30 when it reaches the transport/storage position shown in FIG. 5A. Another edge 97 of the latch plate 86 serves as a stop against a portion of the center tool bar 20 when the main wing reaches the extended position shown in FIG. 5C. The main wing 30 includes a latching pin 98 rigidly connected thereto for engaging with the latch plate 86. Specifically, the main wing 30 is rotated about the main wing pivot 88 from the storage/transport position shown in FIG. 5A toward the extended position shown in FIG. 5C by retracting the piston 84a into the cylinder 84b. As this occurs, the latching pin 98 will begin to contact and travel upwardly on the inclined edge 86a of the pivoting latch plate 86. As the main wing 30 reaches the fully extended position shown in FIG. 5C, the latching pin 98 will engage and stop in the notch 86b thereby stopping the main wing 30 in the fully extended position (see FIGS. 3, 6A and 6B). The reverse procedure will occur when the hydraulic piston 84a is extended from the cylinder 84b to rotate the main wing 30 back to the storage/transport position shown in FIG. 5A.

One or more of the tools 46 are configured to be oriented vertically upward when in the storage/transport position, such as shown in FIGS. 1 and 2. One or more of the tools 46 may be configured to fit substantially between the outermost wheels 16 on each side of the apparatus 10 when in the storage/transport position. Preferably, all of the tools 46 are configured to fit substantially within the width "W" when in the storage/transport position.

Referring now to FIGS. 6A, 6B, 7A and 7B, the apparatus 10 further includes an actuation system 100 coupled with the center tool bar 20 for vertically raising and lowering the center tool bar 20, the first main wing 30 and the second main wing 32 simultaneously between a raised position (FIGS. 6A and 7A) and a lower, operational position (FIGS. 6B and 7B) configured to engage the tools 46 with the ground or soil 102. The outer wing section 42 further includes a freely rotating wheel 104 for supporting the main wing 30 along the soil 102. The system 100 comprises one or more actuators, such as hydraulic cylinders 106 pivotally coupled at one end to the frame structure 14 and pivotally coupled at the opposite end to the center tool bar 20. The center tool bar 20 is coupled for vertical movement relative to the frame structure 14 by a four bar linkage 110. One vertical link 110a is secured to or part of the frame structure 14, and the other vertical link 110b is secured to or part of the center tool bar 20. A pair of upper and lower links 110c, 110d extend between the vertical links 110a, 110b and are coupled to the respective links 110a, 110b by pivot joints 112. As shown, retracting the piston 106a will lower the center tool bar 20 and extending the piston 106a will raise the center tool bar 20. Because the main wings 30, 32 and the auxiliary wings 60, 62 are coupled to the center tool bar 20, all of these components as well as all of the tools 46 will be simultaneously raised and lowered by the system 100 as illustrated in FIGS. 6A, 6B, 7A and 7B.

As further shown in the various figures, liquid dispensers 120 are respectively attached or associated with each tool 46. Flexible tubing (not shown) is used to direct liquid held in the tank 12 to each dispenser 120 under suitable pressure, such as by a pump system (not shown). In this illustrative embodiment the liquid dispensers comprise injectors that are fluidly coupled to the tank 12 such that fertilizer or other liquid in the tank 12 can be pumped to each injector 120 and directed into a depression or slit in the soil 102 formed by each coulter 46. In other embodiments, the liquid dispensers 120 may take other forms, such as spray nozzles or simply one or more tubes that are fluidly connected to the tank 12, and which include one or more openings for delivering the liquid in the desired manner. In addition, in certain embodiments, the liquid dispensers 120 may be eliminated and the applicator 10 may simply be utilized with suitable tools, or vice versa, and the tools may be eliminated and the applicator 10 utilized only with liquid dispensers such as nozzles, open-ended tubes or any other suitable liquid delivery dispenser. In still further embodiments, the liquid dispensers 120 may be re-configured to dispense a granulated solid material, such as fertilizer or the like, in any desired manner.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept. For example, any of the individual features or aspects described herein may be utilized alone or together in any combination depending on the desired results and attendant advantages.

What is claimed is:

1. An agricultural apparatus, comprising:
    a frame structure having a longitudinal axis and laterally opposed sides;
    a first wheel on one side of the frame structure, and a second wheel on an opposite side of the frame structure for allowing movement of the apparatus during transport and operation;
    a center tool bar coupled to the frame structure;
    first and second main wings respectively coupled for pivoting movement relative to opposite end portions of the center tool bar, the first and second main wings each including inner and outside wing sections, the first main wing on one side of the frame structure and the second main wing on an opposite side of the frame structure, and first and second auxiliary wings pivotable between extended positions and retracted, storage positions for shipping or transport;
    respective sets of tools coupled to each of the first and second main wings and to the first and second auxiliary wings, wherein the sets of tools coupled to the first and second auxiliary wings are positioned between the sets of tools coupled to the first and second main wings; and
    an actuator coupled to the center tool bar for vertically raising and lowering the center tool bar, the first main wing and the second main wing simultaneously between a raised position and a lower, operational position configured to engage the tools with the ground;
    wherein the first and second main wings include respective raised sections each configured to extend over a respective wheel on a corresponding side of the frame structure in the storage position, and the raised sections are each comprised of a frame having a generally concave shape receiving a portion of one of the first and second wheels in the storage position.

2. The apparatus of claim 1, wherein the outside wing sections are respectively rotatable into positions above the inner wing sections in the storage positions.

3. The apparatus of claim 1, wherein the first and second auxiliary wings are pivotable about respective horizontal axes of rotation to allow each of the first and second auxiliary wings to be rotated between the respective storage positions and extended positions.

4. The apparatus of claim 3, wherein the storage positions of the first and second auxiliary wings are substantially within a widthwise dimension of the apparatus defined generally between the first and second wheels.

5. The apparatus of claim 1, wherein each of the inner wing sections further comprises an inner wing member pivotally coupled to a mid wing member, and each of the outer wing sections comprises an outer wing member, the outer wing members being pivotally coupled, respectively, to the mid wing members.

6. The apparatus of claim 1, further comprising:
    first and second actuators coupled respectively to the inner wing sections of the first and second main wings for rotating the first and second main wings relative to the center tool bar; and
    first and second latch mechanisms located at the respective ends of the center tool bar, the first and second latch mechanisms being operated to lock and unlock the first and second main wings by the respective first and second actuators as the first and second main wings are rotated relative to the center tool bar.

7. The apparatus of claim 1, wherein the one or more of the tools comprise at least one of a coulter, a knife, a spike, a tine, and a ripper point.

8. The apparatus of claim 7, wherein one or more of the tools is configured to be oriented vertically upward when in the storage position.

9. The apparatus of claim 1, wherein one or more of the tools is configured to fit substantially between the first and second wheels when in the storage position.

10. The apparatus of claim 1, wherein all of the tools are configured to fit substantially between the first and second wheels when in the storage position.

11. The apparatus of claim 1, wherein the tools comprise coulters coupled for rotation relative to the first and second main wings.

12. The apparatus of claim 1, further comprising a container coupled to the frame structure for holding a material to be dispensed, and dispensers coupled to the first and second main wings and to the first and second auxiliary wings, the dispensers configured to dispense the material held in the container when the first and second main wings and the first and second auxiliary wings are in the extended positions.

13. A method for operating an agricultural apparatus, the agricultural apparatus including a frame structure having a longitudinal axis and laterally opposed sides, a first wheel on one side of the frame structure, and a second wheel on an opposite side of the frame structure for allowing movement of the apparatus during transport and operation, a tool bar coupled to the frame structure, first and second main wings each including inner and outer wing sections, respective sets of tools coupled to the first and second main wings, the first main wing on one side of the frame structure and the second main wing on an opposite side of the frame structure, wherein the first and second main wings each include a raised, concave section, and the method comprising:

rotating the first and second main wings about respective axes of rotation to extended positions in which the first and second main wings extend laterally outward from the frame structure for an agricultural operation, rotating the first and second main wings from the extended positions to respective retracted, storage positions generally along a length of the frame structure for shipping or transport, wherein each of the raised, concave sections extends over a respective one of the first or second wheels on a corresponding side of the frame structure in the storage position, rotating the first and second auxiliary wings between first and second storage positions and first and second laterally extended positions, and engaging the tools with the ground when the first and second main wings and the first and second auxiliary wings are in their extended positions.

14. The method of claim 13, wherein the first and second auxiliary wings are pivotable about respective horizontal axes of rotation, and the method further comprises:

rotating each of the first and second auxiliary wings between respective storage positions and extended positions about the respective horizontal axes.

15. The method of claim 13, further comprising:

placing the first and second auxiliary wings in the storage positions substantially between the first and second wheels.

16. The method of claim 13, wherein the apparatus further comprises a center tool bar pivotally coupled to the first main wing on one end portion thereof and pivotally coupled to the second main wing on the opposite end portion thereof, first and second actuators coupled respectively to the first and second main wings, and first and second latch mechanisms located at the respective end portions of the center tool bar, and the method further comprises:

rotating the first and second main wings relative to the center tool bar with the respective first and second actuators; and locking the first and second main wings in the extended positions with the first and second latch mechanisms by using the respective first and second actuators as the first and second main wings are rotated relative to the center tool bar.

17. The method of claim 13, wherein each of the inner wing sections further comprises an inner wing member pivotally coupled to a mid wing member, and each of the outer wing sections comprises an outer wing member, the outer wing members being pivotally coupled, respectively, to the mid wing members, and the method further comprises:

establishing a folded condition of the apparatus by:

a) folding the respective outer wing members into positions above the mid wing members; and b) rotating the inner wing members rearwardly to place the raised, concave sections over the first and second wheels.

18. The method of claim 13, wherein the apparatus further comprises a container coupled to the frame structure for holding a liquid material or a solid granulated material, and dispensers coupled to the first and second main wings, and the method further comprises:

dispensing material from the container using the dispensers when the first and second main wings are in the extended positions.

19. The method of claim 18, further comprising:

vertically raising and lowering the first and second main wings simultaneously between a raised position and a lower, operational position configured to engage the tools with the ground and apply liquid or solid granulated material from the container.

20. An agricultural applicator, comprising:

a frame structure having a longitudinal axis and laterally opposed sides;

a first wheel on one side of the frame structure, and a second wheel on an opposite side of the frame structure for allowing movement of the applicator during transport and operation;

a container coupled to the frame structure and adapted to hold a material to be applied;

a center tool bar coupled to the frame structure;

first and second main wings respectively coupled for pivoting movement relative to opposite end portions of the center tool bar, the first and second main wings each including inner and outer wing sections, the first main wing, on one side of the frame structure and the second main wing on an opposite side of the frame structure, and first and second auxiliary wings pivotable between extended positions and retracted, storage positions for shipping or transport;

respective dispensers coupled to each of the first and second main wings and to the first and second auxiliary wings, wherein the dispensers coupled to the first and second auxiliary wings are positioned between the dispensers coupled to the first and second main wings; and an actuator coupled to the center tool bar for vertically raising and lowering the center tool bar, the first main wing and the second main wing simultaneously between a raised position and a lower, operational position configured to apply material from the container through the dispensers;

wherein the first and second main wings include respective raised sections each configured to extend over a respective wheel on a corresponding side of the frame structure in the storage position, and the raised sections are each comprised of a frame having a generally concave shape receiving a portion of one of the first and second wheels in the storage position.

* * * * *